(12) United States Patent
Tanaka et al.

(10) Patent No.: US 9,102,840 B2
(45) Date of Patent: Aug. 11, 2015

(54) POLYURETHANE RESIN ADDITION PIGMENT, PROCESS FOR PRODUCING POLYURETHANE RESIN ADDITION PIGMENT, PIGMENT DISPERSION COMPOSITION, AND JET PRINTING INK COMPOSITION

(75) Inventors: Shigehiro Tanaka, Tokyo (JP); Asami Takenaka, Tokyo (JP); Yukari Ishibashi, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 198 days.

(21) Appl. No.: 13/816,684

(22) PCT Filed: Jul. 1, 2011

(86) PCT No.: PCT/JP2011/065165
§ 371 (c)(1),
(2), (4) Date: Apr. 5, 2013

(87) PCT Pub. No.: WO2012/020611
PCT Pub. Date: Feb. 16, 2012

(65) Prior Publication Data
US 2013/0217826 A1 Aug. 22, 2013

(30) Foreign Application Priority Data
Aug. 12, 2010 (JP) ................................. 2010-180794

(51) Int. Cl.
*C09D 11/324* (2014.01)
*C08G 18/08* (2006.01)
*C08G 18/34* (2006.01)
*C08G 18/36* (2006.01)
*C08G 18/40* (2006.01)
*C08G 18/42* (2006.01)
*C08G 18/48* (2006.01)
*C08G 18/66* (2006.01)
*C08G 18/75* (2006.01)
*C09C 1/56* (2006.01)
*C09C 3/10* (2006.01)
*C08K 5/00* (2006.01)
*C08K 9/08* (2006.01)
*C08G 18/83* (2006.01)
*C09D 17/00* (2006.01)

(52) U.S. Cl.
CPC .......... *C09D 11/324* (2013.01); *C08G 18/0823* (2013.01); *C08G 18/348* (2013.01); *C08G 18/36* (2013.01); *C08G 18/4018* (2013.01); *C08G 18/42* (2013.01); *C08G 18/4833* (2013.01); *C08G 18/6696* (2013.01); *C08G 18/755* (2013.01); *C08G 18/833* (2013.01); *C08K 5/0041* (2013.01); *C08K 9/08* (2013.01); *C09C 1/56* (2013.01); *C09C 3/10* (2013.01); *C09D 17/005* (2013.01); *C01P 2006/12* (2013.01); *C01P 2006/19* (2013.01)

(58) Field of Classification Search
CPC ............................ C08G 18/0823; C08G 18/26
USPC ................................................... 523/160, 161
See application file for complete search history.

(56) References Cited

U.S. PATENT DOCUMENTS

| | | | |
|---|---|---|---|
| 4,880,857 A | 11/1989 | Mori et al. | |
| 4,940,749 A | 7/1990 | Mori et al. | |
| 4,994,520 A | 2/1991 | Mori et al. | |
| 6,372,820 B1 | 4/2002 | Devonport | |
| 2004/0102542 A1 | 5/2004 | Pears et al. | |
| 2008/0145563 A1 | 6/2008 | Heischkel et al. | |
| 2008/0146691 A1 | 6/2008 | Kruger et al. | |
| 2008/0182080 A1 | 7/2008 | Kruger et al. | |
| 2010/0029807 A1 | 2/2010 | Jonschker et al. | |
| 2012/0190789 A1* | 7/2012 | Sekiyama et al. | 524/591 |

FOREIGN PATENT DOCUMENTS

| | | |
|---|---|---|
| CN | 1122605 A | 5/1996 |
| JP | 64-079278 A | 3/1989 |
| JP | 06-293863 A | 10/1994 |
| JP | 08-003498 A | 1/1996 |
| JP | 08-218015 A | 8/1996 |
| JP | 09-118821 A | 5/1997 |

(Continued)

OTHER PUBLICATIONS

International Search Report for PCT/JP2011/065165, mailing date of Oct. 4, 2011.

(Continued)

*Primary Examiner* — Doris Lee
(74) *Attorney, Agent, or Firm* — Westerman, Hattori, Daniels & Adrian, LLP

(57) ABSTRACT

A polyurethane resin-bonded pigment may exhibit excellent image density, dispersibility, storage stability, and resolubility, and may form an ink film that exhibits marker resistance and rubfastness. The polyurethane resin-bonded pigment is produced by bringing (I) a pigment having a surface acidic group into contact with (II) a basic compound having two or more amino groups selected from a primary amino group and a secondary amino group in its molecule in an aqueous medium to obtain a pigment having an unreacted surface amino group, and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

24 Claims, No Drawings

(56) References Cited

FOREIGN PATENT DOCUMENTS

| | | |
|---|---|---|
| JP | 09-151316 A | 6/1997 |
| JP | 2004-515559 A | 5/2004 |
| JP | 2004-516355 A | 6/2004 |
| JP | 2007-291194 A | 11/2007 |
| JP | 2007-297436 A | 11/2007 |
| JP | 2007-308582 A | 11/2007 |
| JP | 2008-531778 A | 8/2008 |
| JP | 2010-007059 A | 1/2010 |
| WO | 2008/146410 A1 | 12/2008 |
| WO | 2011/027785 A1 | 3/2011 |
| WO | WO 2011/027785 * | 3/2011 |

OTHER PUBLICATIONS

Chinese Office Action dated Jan. 27, 2014, issued in corresponding Chinese Patent Application No. 201180039231.8, w/English translation, (7 pages).

Extended European Search Report dated Jul. 15, 2014, issued in corresponding European Patent Application No. 11816277.5 (6 pages).

* cited by examiner

POLYURETHANE RESIN ADDITION PIGMENT, PROCESS FOR PRODUCING POLYURETHANE RESIN ADDITION PIGMENT, PIGMENT DISPERSION COMPOSITION, AND JET PRINTING INK COMPOSITION

TECHNICAL FIELD

The invention relates to a polyurethane resin-bonded pigment, a process for producing a polyurethane resin-bonded pigment, a pigment dispersion composition, and an inkjet ink composition.

BACKGROUND ART

In recent years, an aqueous ink that is safe and has small environmental impact has been widely used in various fields instead of an organic solvent-based ink. In business applications or the like, an odorless aqueous coloring material is indispensable as an ink used for printing in offices. In industrial applications, there has been an increasing tendency to reduce the use of an organic solvent as much as possible from the viewpoint of an improvement in working environment, an improvement in safety of ink and paint, and waste disposal. An aqueous coloring material also has an advantage in that the production cost can be reduced as compared with an organic solvent-based coloring material since special equipment (e.g., explosion-proof system, ventilator, and organic solvent recovery unit) is unnecessary during production.

A dye or a pigment has been mainly used as the aqueous coloring material depending on the application. A dye can easily form a high-resolution image that exhibits an excellent tone, but exhibits poor light resistance as compared with a pigment. A pigment exhibits poor dispersibility as compared with a dye, but exhibits excellent water resistance and light resistance. A number of pigment inks have been developed along with the development of a dispersion technique.

An aqueous liquid ink for gravure printing or offset printing has been developed. An inkjet recording method has been most widely used as an aqueous ink recording method for office applications.

The inkjet recording method discharges ink droplets from a minute nozzle head to record characters or figures on the surface of a recording medium (e.g., paper). The noncontact inkjet recording method can implement easy on-demand full-color printing of an image on various recording media (e.g., plain paper) without requiring a printing plate.

An inkjet printer that utilizes the inkjet recording method discharges ink droplets from a minute nozzle head to record characters or figures on the surface of a recording medium (e.g., paper). Typical inkjet printing methods include a Bubble Jet (registered trademark) method and a piezo method. The Bubble Jet method instantaneously heats an ink introduced into the nozzle head using a heater to produce bubbles, and intermittently discharges the ink by utilizing the volume expansion due to the bubbles. The piezo method converts an electrical signal into a mechanical signal using an electrostrictive element (piezoelectric element), and intermittently discharges ink droplets stored in the nozzle head.

A black inkjet printer ink composition (inkjet ink composition) has been widely used in offices and the like mainly in order to print documents. A number of aqueous black pigment ink compositions that are optimized for the recording method and the recording speed of each printer have been proposed.

For example, Patent Document 1 discloses an aqueous black pigment ink composition that is provided with improved dispersibility in an aqueous medium by hydrophilizing the surface of the black pigment. However, since the ink composition disclosed in Patent Document 1 may penetrate when printed on plain paper, a decrease in image density, offset, curling of the recording paper, and the like may occur. In particular, since the amount of ink discharged per unit time has increased along with an increase in printing speed of inkjet printers, a sufficient image density may not be obtained when using a related-art aqueous black pigment.

Since a pigment exhibits a strong interparticle cohesive force, but exhibits weak affinity to an organic polymer, water, an organic solvent, and the like, it is very difficult to uniformly mix or disperse a pigment under normal mixing or dispersion conditions. In order to deal with this problem, attempts have been made to improve the dispersibility of a pigment by improving the affinity of the pigment to a solid or liquid component by causing a dispersant (e.g., surfactant or resin) to be adsorbed on the surface of the pigment, or coating the entire surface of the pigment with the dispersant (see Patent Document 2, for example).

Since a printer used for industrial applications has a high print speed, and cannot be frequently subjected to head cleaning as compared with a printer used for personal applications, an inkjet ink composition that does not contaminate or clog the head during continuous or intermittent inkjet operations, and exhibits resolubility (i.e., the dried ink composition is redissolved in the undried ink composition, and does not contaminate or clog the nozzle head during continuous or intermittent inkjet operations) has been desired. The same technical problem exists in the field of spray coating compositions and the like.

RELATED-ART DOCUMENT

Patent Document

Patent Document 1: JP-A-08-003498
Patent Document 2: JP-A-08-218015

SUMMARY OF THE INVENTION

Technical Problem

The inventors of the invention conducted extensive studies, and found that an aqueous pigment ink composition in which a dispersant is adsorbed on the surface of a pigment has a problem in that the dispersant may be removed from the surface of the pigment due to a strong shear force that is applied when the ink composition is discharged from a thin nozzle of a nozzle head, or the dispersant may be removed from the surface of the pigment during long-term storage, so that the dispersion state of the pigment may become unstable (i.e., the storage stability may deteriorate). When a water-dispersible resin such as an acrylic emulsion is added in order to improve the rubfastness and the marker resistance of the ink film, a decrease in storage stability and discharge stability occurs. When forming a pigment microcapsule by coating the entire pigment with the dispersant, the image density significantly decreases in spite of excellent storage stability.

It has been known that a coloring agent that remains on the surface of printed matter such as paper without penetrating the printed matter as a result of decreasing the functional group concentration on the surface of the pigment achieves high image density. In this case, however, a decrease in dispersion stability, resolubility, and rubfastness occurs.

An object of the invention is to provide a pigment, a process for producing a pigment, a pigment dispersion composition, and an inkjet ink composition that can overcome the above trade-off relationship, may exhibit or implement excellent image density, dispersibility, storage stability, and resolubility, and may form or provide an ink film that exhibits marker resistance and rubfastness.

Solution to Problem

The inventors further conducted extensive studies in order to achieve the above object. As a result, the inventors found that the above technical problem can be solved by a polyurethane resin-bonded pigment that is produced by bringing (I) a pigment having a surface acidic group into contact with (II) a basic compound having two or more amino groups selected from a primary amino group and a secondary amino group in its molecule in an aqueous medium to obtain a pigment having an unreacted surface amino group, and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond. This finding has led to the completion of the invention.

Specifically, several aspects of the invention provide the following.

(1) A polyurethane resin-bonded pigment produced by bringing (I) a pigment having a surface acidic group into contact with (II) a basic compound having two or more amino groups selected from a primary amino group and a secondary amino group in its molecule in an aqueous medium to obtain a pigment having an unreacted surface amino group, and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

(2) The polyurethane resin-bonded pigment according to (1), wherein the water-dispersible polyurethane resin (III) having an isocyanate end group has an acid number of 20 to 120 mg KOH/g on a solid basis.

(3) The polyurethane resin-bonded pigment according to (1), wherein the pigment (I) having a surface acidic group is self-dispersible carbon black having a surface acidic group.

(4) The polyurethane resin-bonded pigment according to (2), wherein the pigment (I) having a surface acidic group is self-dispersible carbon black having a surface acidic group.

(5) A process for producing a polyurethane resin-bonded pigment including:
bringing (I) a pigment having a surface acidic group into contact with (II) a basic compound having two or more amino groups selected from a primary amino group and a secondary amino group in its molecule in an aqueous medium to obtain a pigment having an unreacted surface amino group; and
bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

(6) The process according to (5), wherein the water-dispersible polyurethane resin (III) having an isocyanate end group has an acid number of 20 to 120 mg KOH/g on a solid basis.

(7) The process according to (5), wherein the pigment (I) having a surface acidic group is self-dispersible carbon black having a surface acidic group.

(8) The process according to (6), wherein the pigment (I) having a surface acidic group is self-dispersible carbon black having a surface acidic group.

(9) A pigment dispersion composition including the polyurethane resin-bonded pigment according to any one of (1) to (4).

(10) A pigment dispersion composition including a polyurethane resin-bonded pigment produced by the process according to any one of (5) to (8).

(11) An inkjet ink composition including the polyurethane resin-bonded pigment according to any one of (1) to (4).

(12) An inkjet ink composition including a polyurethane resin-bonded pigment produced by the process according to any one of (5) to (8).

Note that the pigment (I) having a surface acidic group may be hereinafter referred to as "pigment (I)", the basic compound (II) having two or more amino groups selected from a primary amino group and a secondary amino group in its molecule may be hereinafter referred to as "basic compound (II)", and the water-dispersible polyurethane resin (III) having an isocyanate end group may be hereinafter referred to as "water-dispersible polyurethane resin (III)".

Advantageous Effects of the Invention

According to the aspects of the invention, when the pigment (I) having a surface acidic group is brought into contact with the basic compound (II) having two or more amino groups selected from a primary amino group and a secondary amino group in its molecule in the aqueous medium, the basic compound is ionically attracted to the pigment. When the water-dispersible polyurethane resin (III) and the polyisocyanate compound (IV) are brought into contact with the resulting pigment having an unreacted surface amino group, the unreacted surface amino group of the pigment forms a urea bond with the water-dispersible polyurethane resin (III) having an isocyanate end group, and the water-dispersible polyurethane resin (III) and the polyisocyanate compound (IV) form an elongated chain, a branched structure, or a network structure. It is thus possible to provide a polyurethane resin-bonded pigment wherein a highly crosslinked resin is bonded to the surface of the pigment. Since the polyurethane resin-bonded pigment has the above specific structure, it is possible to achieve excellent image density, dispersibility, storage stability, and resolubility, and form an ink film that exhibits marker resistance and rubfastness.

The aspects of the invention also provide the process for producing a polyurethane resin-bonded pigment, the pigment dispersion composition, and the inkjet ink composition.

DESCRIPTION OF EMBODIMENTS

A polyurethane resin-bonded pigment according to one embodiment of the invention is described below.

The polyurethane resin-bonded pigment according to one embodiment of the invention is produced by bringing (I) a pigment having a surface acidic group into contact with (II) a basic compound having two or more amino groups selected from a primary amino group and a secondary amino group in its molecule in an aqueous medium to obtain a pigment having an unreacted surface amino group, and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

The pigment (I) having a surface acidic group that is used to produce the polyurethane resin-bonded pigment according to one embodiment of the invention is preferably a pigment having an acidic surface. Examples of such a pigment include a pigment that has been subjected to surface acidification using a synergist, a pigment into which a surface acidic group has been introduced via diazo coupling, a pigment into which a surface acidic group (e.g., phenolic hydroxyl group or carboxyl group) has been introduced via an oxidation treatment, and a pigment that has been acidified by surface treatment, and neutralized with a counter ion.

A black pigment having a surface acidic group is preferable as the pigment (I) having a surface acidic group that is used to produce the polyurethane resin-bonded pigment according to one embodiment of the invention. Specific examples of the black pigment include ivory black, peach black, lamp black, mars black, bitumen, titanium black, carbon black, and the like. Among these, it is preferable to use carbon black since carbon black exhibits excellent blackness and tinting strength when used as an inkjet recording black pigment. It is particularly preferable to use self-dispersible carbon black having a surface acidic group as the pigment (I) having a surface acidic group from the viewpoint of the dispersibility, discharge stability, and the like of the resulting ink composition.

The term "self-dispersible carbon black pigment having a surface acidic group" used herein refers to a carbon black pigment that has a structure in which at least one hydrophilic group (e.g., acidic group) is bonded to the surface of the carbon black pigment either directly or via another atomic group, and can maintain a stably dispersed state without the addition of a surfactant or a polymer compound when suspended in water to prepare a dispersion, the dispersion of the carbon black pigment having a surface tension almost equal to that of water. The term "self-dispersible carbon black pigment" used herein includes a self-dispersible carbon black pigment in which the hydrophilic group (e.g., acidic group) is neutralized with a counter ion.

Examples of the carbon black include furnace black, channel black, acetylene black, thermal black, and the like. These carbon blacks have a high carbon content, exhibit high blackness due to an amorphous structure, have a high drying rate as compared with peach black, lamp black, and the like, exhibit high storage stability, and are inexpensive.

A pigment aqueous dispersion prepared using ultrafine carbon black (e.g., furnace black or channel black) exhibits high resolution and excellent print quality when used as an inkjet printer ink composition.

It is preferable to use carbon black having a specific surface area by nitrogen adsorption ($N_2SA$) of 50 $m^2/g$ or more, more preferably 50 to 300 $m^2/g$, and still more preferably 80 to 250 $m^2/g$. It is preferable to use carbon black having a DBP absorption of 50 $cm^3/100$ g or more, more preferably 50 to 200 $cm^3/100$ g, and still more preferably 80 to 180 $cm^3/100$ g.

When using self-dispersible carbon black having a surface acidic group as the pigment (I) having a surface acidic group, it is preferable to use self-dispersible carbon black having a carboxyl group equivalent of 200 to 1200 µmol/g, more preferably 400 to 1000 µmol/g, and still more preferably 600 to 800 µmol/g.

If the $N_2SA$ and the DBP absorption of the carbon black are within the above ranges, the resulting aqueous pigment dispersion exhibits excellent dispersibility in an aqueous medium and excellent ink performance when used as an inkjet ink composition.

Note that the term "specific surface area by nitrogen adsorption ($N_2SA$)" used herein refers to a value measured in accordance with "Carbon black for rubber industry—Fundamental characteristics—Part 2: Determination of specific surface area—Nitrogen adsorption methods—Single-point procedures" specified in JIS K 6217-2, and the term "DBP absorption" used herein refers to a value measured in accordance with "Carbon black for rubber industry—Fundamental characteristics—Part 4: Determination of dibutylphthalate absorption number" specified in JIS K 6217-4.

The average particle size of the primary particles of the carbon black is preferably 10 to 70 nm, more preferably 15 to 43 nm, and still more preferably 18 to 30 nm. Note that the term "average particle size" used herein in connection with the primary particles of the carbon black refers to the arithmetic mean value of the particle sizes of 2000 to 10,000 primary particles measured using an electron microscope having a resolution of 15 angstroms or more.

Specific examples of the carbon black include Tokablack #8500, Tokablack #8500F, Tokablack #75505B, Tokablack #7550F (manufactured by Tokai Carbon Co., Ltd.); #650, #750, MA600, #44B, #44, #45B, MA7, MA11, #47, #45, #33, #45L, #47, #50, #52, MA77, MA8 (manufactured by Mitsubishi Chemical Corp.); FW200, FW2V, FW1, FW18PS, NIpex 180 IQ, FW1, Special Black 6, S160, S170 (manufactured by Degussa); Black Pearls 1000M, Black Pearls 800, Black Pearls 880, Monarch 1300, Monarch 700, Monarch 880, CRX 1444, Regal 330R, Regal 660R, Regal 660, Regal 415R, Regal 415, Black Pearls 4630, Monarch 4630 (manufactured by Cabot); Raven 7000, Raven 3500, Raven 5250, Raven 5750, Raven 5000 ULTRA II, HV 3396, Raven 1255, Raven 1250, Raven 1190, Raven 1000, Raven 1020, Raven 1035, Raven 1100 ULTRA, Raven 1170, Raven 1200 (manufactured by Columbian); DB 1305 (manufactured by KOSCO); Sunblack 700, 705, 710, 715, 720, 725, 300, 305, 320, 325, X25, X45 (manufactured by Asahi Carbon Co., Ltd.); N220, N110, N234, N121 (manufactured by Sid Richardson); Niteron #300 (manufactured by Nippon Steel Chemical Carbon Co., Ltd.), Showblack N134, N110, N220, N234, N219 (manufactured by Cabot Japan K.K.); and the like.

The pigment (I) having a surface acidic group that is used to produce the polyurethane resin-bonded pigment according to one embodiment of the invention may be obtained by acidifying the surface of a pigment using a synergist such as phthalocyaninesulfonic acid, or introducing an acidic group into the surface of a pigment via diazo coupling, or introducing an acidic group (e.g., phenolic hydroxyl group or carboxyl group) into the surface of a pigment via an oxidation treatment. It is preferable to subject carbon black to such a treatment.

The oxidation treatment may be implemented by a known method (e.g., liquid-phase oxidation or gas-phase oxidation).

When implementing the oxidation treatment by liquid-phase oxidation, an oxidizing agent (e.g., hydrogen peroxide solution, nitric acid, sulfuric acid, chlorate, persulfate, or percarbonate) may be used. For example, a pigment such as carbon black may be added to an aqueous solution that contains the oxidizing agent, and the mixture may be stirred to obtain a pigment having a surface acidic group. An acidic group can be uniformly introduced into the surface of the pigment (e.g., carbon black) by controlling the amount of the oxidizing agent and the reaction temperature.

When implementing the oxidation treatment by gas-phase oxidation, ozone oxidation or air oxidation may be used. Gas-phase oxidation has advantages in that the drying cost is unnecessary, and the operation is easy as compared with liquid-phase oxidation, for example.

The acidic group introduced into the surface of the pigment via the oxidation treatment or the like is not particularly limited as long as the acidic group may undergo an acid-base reaction with a basic compound having an amino group to form a salt. Examples of the acidic group include a carboxyl group, a sulfone group, and the like. The amount (number) of the acidic groups introduced into the surface of the pigment may be controlled by controlling the gas-phase oxidation conditions or the liquid-phase oxidation conditions.

An example in which oxidized carbon black (i.e., a black pigment having a surface acidic group) is produced by liquid-phase oxidation is described below.

Carbon black, the oxidizing agent, and the aqueous medium (preferably deionized water) are mixed in a stirring tank in an appropriate quantitative ratio. The mixture is sufficiently stirred in the stirring tank at an appropriate temperature (e.g., room temperature to 90° C., and preferably 60 to 90° C.) so that the carbon black is oxidized to obtain an aqueous dispersion (slurry) of a surface-oxidized pigment (i.e., a carbon black aggregate (agglomerate) on which a hydrophilic functional group (e.g., carboxyl group or hydroxyl group) is formed).

The carbon black can be efficiently dispersed in the slurry, and an acidic group can be uniformly and effectively produced by subjecting the carbon black to wet or dry oxidation in advance. When using wet oxidation, it is preferable to oxidize the carbon black using ozone water, a hydrogen peroxide solution, a peroxo diacid, or a salt thereof. When using dry oxidation, it is preferable to oxidize the carbon black by exposing the carbon black to a gas such as ozone, oxygen, $NO_X$, or $SO_X$.

It is also preferable to use (add) a surfactant in order to uniformly disperse the surface-oxidized pigment in the slurry. An anionic surfactant, a nonionic surfactant, or a cationic surfactant may be used as the surfactant. Examples of the anionic surfactant include fatty acid salts, alkylsulfuric acid salts, alkylarylsulfonic acid salts, and the like. Examples of the nonionic surfactant include polyoxyethylene alkyl ethers, polyoxyethylene alkyl aryl ethers, and the like. Examples of the cationic surfactant include alkylamine salts, quaternary ammonium salts, and the like.

The slurry of the surface-oxidized pigment thus obtained may be reacted directly with the basic compound, or the surface-oxidized pigment may be subjected to a partial neutralization treatment (i.e., a treatment that neutralizes some of the acidic groups (surface functional groups)) in order to suppress aggregation of the surface-oxidized pigment or an increase in viscosity.

When subjecting the surface-oxidized pigment to the partial neutralization treatment, it is preferable to remove reduced salts (i.e., a reduced product of the oxidizing agent) produced by the oxidation treatment in advance. The subsequent neutralization reaction proceeds efficiently as a result of removing reduced salts, so that re-aggregation of the surface-oxidized pigment can be suppressed due to improved dispersibility in water. It is preferable to remove the reduced salts using a separation membrane such as an ultrafiltration (UF) membrane, a reverse osmosis (RO) membrane, or an electrodialysis membrane.

It is preferable to subject the surface-oxidized pigment to the partial neutralization treatment by adding a neutralizer to the slurry, and heating the mixture. Examples of the neutralizer include, but are not limited to, alkali salts such as potassium hydroxide and sodium hydroxide, ammonia, and organic amines such as ethanolamine, triethanolamine, dimethylaminoethanol, and quaternary amines. The amount of the neutralizer added to the slurry is adjusted depending on the amount (number) of surface functional groups introduced into the pigment, but is preferably 50 to 100 mol % based on the amount of surface (acidic) functional groups. The pigment may be neutralized at room temperature. It is preferable to add the neutralizer to the slurry of the pigment contained in a stirring tank, and stir the mixture at 40 to 100° C. for 1 to 16 hours.

It is preferable to remove undispersed aggregates and large particles present in the slurry of the pigment by centrifugation, filtration, or the like. The particle size distribution of the resulting aqueous pigment dispersion can be controlled by removing undispersed aggregates and large particles. This makes it possible to suppress clogging of a nozzle during printing when using the aqueous pigment dispersion as an inkjet printer ink composition.

When subjecting the pigment (slurry) to the neutralization treatment, it is preferable to remove salts (i.e., an oxide of the neutralizer) produced by the neutralization treatment. The dispersibility of the pigment in water can be improved by removing salts, so that re-aggregation of the surface-oxidized pigment can be suppressed. It is preferable to remove the salts using a separation membrane such as an ultrafiltration (UF) membrane, a reverse osmosis (RO) membrane, or an electrodialysis membrane.

When a self-dispersible pigment (i.e., the pigment (I) having a surface acidic group) is neutralized with a counter ion, the pigment particles are normally dispersed due to repulsion of the ions, and the storage stability can normally be improved when a polymer is added to the surface of the pigment. However, the dispersion stability deteriorates when the surface of the pigment has a low acidic group concentration. In contrast, since the polyurethane resin-bonded pigment according to one embodiment of the invention is produced by bonding the water-dispersible polyurethane resin (III) having an isocyanate end group to the pigment (I) via a urea bond, the polyurethane resin-bonded pigment exhibits excellent dispersibility and dispersion stability even if the surface of the pigment (I) has a low acidic group concentration.

The concentration of the pigment having a surface acidic group in the slurry is preferably 3 to 30 mass %, more preferably 4 to 28 mass %, and still more preferably 5 to 25 mass %. When the concentration of the pigment having a surface acidic group in the slurry is within the above range, the pigment can easily be reacted with the basic compound (II) having two or more amino groups selected from a primary amino group and a secondary amino group in its molecule by adding a given amount of the basic compound (II) to the slurry.

The pigment (I) having a surface acidic group can be obtained by the above method. Note that a commercially available product such as carbon black that exhibits relatively high dispersion stability (e.g., Aqua-Black (registered trademark) 162 or Aqua-Black (registered trademark) 164 (self-dispersible carbon black manufactured by Tokai Carbon Co., Ltd.)), or carbon black of which the surface has an acidic group concentration equal to or more than 50% and less than 100% of that of the self-dispersible carbon black, may also be used as the pigment having a surface acidic group. When using a commercially available product as the pigment having a surface acidic group, it is preferable to disperse the pigment in the aqueous medium before reacting the pigment with the basic compound having two or more amino groups selected from a primary amino group and a secondary amino group in its molecule. It is more preferable to disperse the pigment in the aqueous medium so that the concentration of the pigment in the aqueous medium is (almost) equal to the concentration of the pigment in the slurry (see above).

The volume average particle size of the carbon black dispersed in water is preferably 30 to 300 nm, more preferably 40 to 270 nm, and still more preferably 50 to 250 nm. Note that the term "volume average particle size" used herein in connection with the carbon black refers to the particle size at 50% (D50) in the cumulative volume particle size distribution measured by a laser diffraction particle size analyzer.

The basic compound (II) having two or more amino groups selected from a primary amino group and a secondary amino group in its molecule is not particularly limited as long as the basic compound (II) may undergo an acid-base reaction with the surface acidic group of the pigment, and may be bonded to the isocyanate end group of the water-dispersible polyurethane resin (III) via a urea bond. Examples of the basic compound (II) include aliphatic polyamines such as ethylenediamine, diethylenetriamine, triethylenetetramine, tetraethylenepentamine, 1,3-propylenediamine, and hexamethylenediamine, aromatic polyamines such as phenylenediamine, diaminonaphthalene, and xylenediamine, alicyclic polyamines such as piperazine, N-aminoethylpiperazine, and isophoronediamine, and the like. These compounds may be used either alone or in combination as the basic compound (II).

The polyurethane resin-bonded pigment according to one embodiment of the invention is produced using the pigment having an unreacted surface amino group that is obtained by bringing the pigment (I) having a surface acidic group into contact with the basic compound (II) having two or more amino groups selected from a primary amino group and a secondary amino group in its molecule in the aqueous medium.

It is preferable to use water as the aqueous medium in which the pigment (I) having a surface acidic group is brought into contact with the basic compound (II) having two or more amino groups selected from a primary amino group and a secondary amino group in its molecule. Examples of a preferable aqueous medium other than water include a water-soluble solvent that does not react with an amine and an isocyanate, such as acetonitrile and ethers such as tetrahydrofuran, ethylene glycol dimethyl ether, and diethylene glycol dimethyl ether. For example, a glycol-based aqueous solvent (e.g., ethylene glycol, propylene glycol, butylene glycol, diethylene glycol, triethylene glycol, or polyethylene glycol), dimethyl sulfoxide, sulfolane, or the like may be used. These aqueous media may be used in combination. Since a glycol-based aqueous solvent that includes an alcoholic hydroxyl group may react with the isocyanate end group of the water-dispersible polyurethane resin (III), it is preferable to add only a limited amount of glycol-based aqueous solvent after reacting the pigment with the polyurethane resin.

The pigment having an unreacted surface amino group that is used as the material for the polyurethane resin-bonded pigment according to one embodiment of the invention is preferably prepared by bringing the pigment (I) having a surface acidic group into contact (reacting the pigment (I) having a surface acidic group) with the basic compound (II) having two or more amino groups selected from a primary amino group and a secondary amino group in its molecule by stirring the pigment (I) and the basic compound (II) in the aqueous medium at 20 to 60° C. for 0.5 to 10 hours.

When the pigment (I) having a surface acidic group is brought into contact with the basic compound (II) in the aqueous medium, the basic compound (II) is present in the vicinity of the surface of the pigment (I) due to an ionic force.

The basic compound (II) is preferably used in such an amount that the water-dispersible polyurethane resin (III) having an isocyanate end group and the polyisocyanate compound (IV) form a resin crosslinked product on the surface of the pigment (I). More specifically, the basic compound (II) is preferably used in such an amount that the equivalent ratio (NCO/(—(R)H and —NH$_2$)) of the isocyanate groups included in the water-dispersible polyurethane resin (III) and the polyisocyanate compound (IV) to the amino groups included in the basic compound (II) is 0.1 to 2.

When the basic compound (II) having two or more amino groups selected from a primary amino group and a secondary amino group in its molecule is brought into contact with the pigment (I) having a surface acidic group in the aqueous medium, the basic compound is ionically attracted to the surface acidic group of the pigment, and is present in the vicinity of the surface of the pigment (i.e., a pigment having an unreacted surface amino group is obtained). The unreacted surface amino group of the pigment forms a urea bond with the water-dispersible polyurethane resin (III) having an isocyanate end group, and the water-dispersible polyurethane resin (III) and the polyisocyanate compound (IV) form an elongated chain, a branched structure, or a network structure, so that a highly crosslinked resin is bonded to the surface of the pigment, and the pigment exhibits excellent dispersibility, storage stability, and the like.

The polyurethane resin-bonded pigment according to one embodiment of the invention is produced by bringing the water-dispersible polyurethane resin (III) having an isocyanate end group and the polyisocyanate compound (IV) dissolved in the water-dispersible polyurethane resin (III) into contact with the pigment having an unreacted surface amino group.

The surface amino group of the pigment and the isocyanate group of the water-dispersible polyurethane resin (III) react instantaneously to form a urea bond. Therefore, the polyurethane resin (III) is crosslinked and elongated on the surface of the pigment, so that the polyurethane resin (III) chemically bonds and physically adheres to the surface of the pigment. The surface of the pigment is thus covered with the water-dispersible polyurethane resin (III).

The water-dispersible polyurethane resin (III) having an isocyanate end group is a polyurethane resin that has an isocyanate group at the end of the molecule, and exhibits dispersibility in water at room temperature.

The water-dispersible polyurethane resin (III) having an isocyanate end group is not particularly limited as long as the isocyanate end group can be bonded to the surface amino group of the pigment via a urea bond.

The water-dispersible polyurethane resin (III) having an isocyanate end group is preferably a polyurethane resin obtained by bonding a compound having a functional group or a molecular chain that can be dispersed in the aqueous medium and having two or more hydroxyl groups in its molecule to a polyisocyanate compound via a urethane bond, in order to subsequently react the polyurethane resin with the surface amino group of the carbon black in the aqueous medium.

The compound having a functional group or a molecular chain that can be dispersed in the aqueous medium and having two or more hydroxyl groups in its molecule is preferably a compound having a functional group that can form a salt that causes phase inversion of the polyurethane resin into the aqueous medium. Specific examples of such a compound include tertiary carboxyl group-containing polyol compounds.

Examples of the tertiary carboxyl group-containing polyol compounds include polyhydroxycarboxylic acids such as dimethylolpropionic acid, dimethylolbutanoic acid, dimethylolacetic acid, dimethylolbutyric acid, dimethylolvaleric acid, and dimethylolcaproic acid. Among these, dihydroxymonocarboxylic acids such as dimethylolpropionic acid and dimethylolbutanoic acid are preferable. Since the tertiary carboxyl group included in the above compounds has very low reactivity with an isocyanate compound, a urethane bond-forming reaction is not hindered, so that the target water-dispersible polyurethane resin can be efficiently produced.

The acid number of the resulting polyurethane resin can be controlled by controlling the amount of the tertiary carboxyl group-containing polyol compound. The water-solubility and the water-dispersibility of the polyurethane resin increase as the acid number of the polyurethane resin increases. The water-solubility and the water-dispersibility of the water-dispersible polyurethane resin can be adjusted by thus adjusting the acid number of the water-dispersible polyurethane resin. A diol compound having a nonionic molecular chain may be used to adjust the water-solubility and the water-dispersibility of the water-dispersible polyurethane resin in addition to the tertiary carboxyl group-containing polyol compound. Examples of the diol compound having a nonionic molecular chain include polyalkylene glycol diols such as polyethylene glycol (PEG) diol, and a copolymer diol of polyethylene glycol (PEG) diol and polypropylene glycol (PPG) diol or polybutylene glycol (PBG) diol.

A polyol having at least two hydroxyl groups in its molecule may be used together with the tertiary carboxyl group-containing polyol compound and the diol compound having a nonionic molecular chain in an arbitrary ratio.

Examples of the polyol having at least two hydroxyl groups in the molecule include a side chain-modified diol that has been chemically modified depending on the application via the Michael addition reaction or the like. The balance between the hydrophilicity and the hydrophobicity of the resulting polyurethane resin can be designed in various ways by introducing a hydrophobic group or a hydrophilic group into the side chain of the diol (polyol).

The side chain-modified diol may be synthesized by subjecting a dialkanolamine and a (meth)acrylic acid derivative to an addition reaction. The Michael addition reaction or the like can be easily controlled when using an acrylic acid derivative that reacts with the dialkanolamine at a low temperature (i.e., exhibits high reactivity) as compared with a methacrylic acid derivative. Examples of the dialkanolamine include dihydroxyalkyl-substituted derivatives of a secondary amine such as diethanolamine, dipropanolamine, and diisopropanolamine. Examples of the (meth)acrylic acid derivative include, but are not limited to, alkyl(meth)acrylates, cycloalkyl(meth)acrylates, aromatic (meth)acrylates, halogenated alkyl(meth)acrylates, (meth)acrylates, aromatic vinyl compounds, vinyl cyanide compounds, unsaturated dibasic acids, and derivatives thereof.

Examples of the alkyl(meth)acrylates include methyl (meth)acrylate, ethyl(meth)acrylate, butyl(meth)acrylate, 2-ethylhexyl(meth)acrylate, and the like.

Examples of the cycloalkyl(meth)acrylates include cyclohexyl(meth)acrylate, methylcyclohexyl(meth)acrylate, bornyl(meth)acrylate, isobornyl(meth)acrylate, adamantyl (meth)acrylate, and the like.

Examples of the aromatic (meth)acrylates include phenyl (meth)acrylate, benzyl(meth)acrylate, and the like.

Examples of the halogenated alkyl(meth)acrylates include fluoromethyl(meth)acrylate, fluoroethyl(meth)acrylate, and the like.

Examples of the (meth)acrylates include hydroxyalkyl (meth)acrylates, glycidyl(meth)acrylate, ethylene glycol (meth)acrylate, polyethylene glycol(meth)acrylate, and the like.

Examples of the aromatic vinyl compounds include styrene, α-substituted styrenes such as α-methylstyrene and α-ethylstyrene, nucleus-substituted styrenes such as fluorostyrene and methylstyrene, and the like.

Examples of the(meth)acrylic acid derivatives include aliphatic monoacrylates such as 2-ethylhexyl(meth)acrylate, lauryl(meth)acrylate, and stearyl(meth)acrylate; alicyclic monoacrylates such as cyclohexyl(meth)acrylate, dicyclopentanyl(metha)acrylate, and isobornyl(meth)acrylate; aromatic monoacrylates such as benzyl(meth)acrylate, phenyl (meth)acrylate, phenoxyethyl(meth)acrylate, phenoxy diethylene glycol(meth)acrylate, phenoxy tetraethylene glycol(meth)acrylate, nonylphenoxyethyl(meth)acrylate, and nonylphenoxy tetraethylene glycol(meth)acrylate; alkyl ether acrylates such as methoxy diethylene glycol(meth)acrylate, ethoxy diethylene glycol(meth)acrylate, butoxyethyl (meth)acrylate, butoxy triethylene glycol(meth)acrylate, and methoxy dipropylene glycol(meth)acrylate; mono(meth) acryloyloxy dibasic acid esters such as 2-(meth)acryloyloxyethyl hydrogen succinate, 2-(meth)acryloyloxyethyl hydrogen hexahydrophthalate, 2-(meth)acryloyloxyethyl hydrogen phthalate, and 2-(meth)acryloyloxypropyl hydrogen phthalate; monoalkyl ether polyoxyalkylene glycol (meth)acrylates such as mono(2-ethylhexyl)ether polyoxyethylene glycol(meth)acrylate, mono(nonylphenyl) ether polyoxyethylene glycol(meth)acrylate, mono(2-ethylhexyl) ether polyoxypropylene glycol(meth)acrylate, and mono(n-onylphenyl)ether polyoxypropylene glycol(meth)acrylate; monoacrylates including a polyoxyethylene ether bond, such as polyethylene glycol mono(meth)acrylate and polypropylene glycol mono(meth)acrylate; hydroxyl group-containing mono(meth)acrylates such as 2-hydroxyethyl(meth)acrylate, 2-hydroxypropyl(meth)acrylate, glycerol mono(meth)acrylate, 2-hydroxy-3-butoxypropyl(meth)acrylate, 2-hydroxy-3-phenoxypropyl(meth)acrylate, and an ε-caprolactone adduct of 2-hydroxyethyl(meth)acrylate; alicyclic ether (meth)acrylates such as glycidyl(meth)acrylate and tetrahydrofurfuryl(meth)acrylate; nitrogen-containing monoacrylates such as N,N-dimethylaminoethyl(meth)acrylate, N,N-diethylaminoethyl(meth)acrylate, morpholino(meth) acrylate, N,N-dimethylacrylamide, dimethylaminopropyl acrylate, and N-isopropylacrylamide; polyoxyalkylene phosphate mono(meth)acrylates such as polyoxyethylene phosphate mono(meth)acrylate and polyoxypropylene phosphate mono(meth)acrylate; and the like.

It is preferable to use an acrylic acid derivative as compared with a methacrylic acid derivative as the raw material that is subjected to the Michael addition reaction for obtaining the side chain-modified diol since an acrylic acid derivative has high reactivity with an amine at a low reaction temperature.

Examples of the polyol having at least two hydroxyl groups in the molecule include diols such as ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, and cyclohexyldimethanol, and high-molecular-weight polyols.

Examples of the high-molecular-weight polyols include polyester polyols such as a polyester diol, high-molecular-weight diols such as a polycarbonatediol, a polylactonediol, and a polybutadienediol, polyether polyols, and the like. Further examples of the high-molecular-weight polyols include polymer diols of a compound that includes a rosin skeleton or a hydrogenated rosin skeleton. It is preferable to use a high-molecular-weight polyol having a number average molecular weight of 300 to 5000, and more preferably 500 to 3000.

Examples of the polyester polyols include a polyester polyol obtained by condensation of one or two or more of a polyol and a polyol generic component and one or two or more of a polybasic acid and an anhydride thereof.

Examples of the polyol used as the raw material for producing the polyester polyol include ethylene glycol, propylene glycol, cyclohexane-1,4-dimethanol, 1,3-butylene glycol, tetramethylene glycol, neopentyl glycol, 1,6-hexanediol, 3-methyl-1,5-pentanediol, 2-ethyl-1,3-hexanediol, 2-butyl-2-ethyl-1,3-propanediol, 2-methyl-1,8-octanediol, 1,9-nonanediol, cyclohexanedimethanol, bisphenol A, bisphenol F, hydrogenated bisphenol A, hydrogenated bisphenol F, a castor oil-modified diol, a castor oil-modified polyol, and the like.

Examples of the polyol generic component used as the raw material for producing the polyester polyol include alkyl monoglycidyl ethers such as butyl glycidyl ether, 2-ethylhexyl glycidyl ether, lauryl glycidyl ether, decyl glycidyl ether, and stearyl glycidyl ether, and monoepoxy compounds such as an alkyl glycidyl ester ("Cardura E10" manufactured by Shell Japan).

Examples of the polybasic acid and an anhydride thereof used as the raw material for producing the polyester polyol include aliphatic dibasic acids such as succinic acid, adipic acid, azelaic acid, sebacic acid, and a dimer acid, anhydrides thereof, aromatic polybasic acids and anhydrides thereof such as dodecenylsuccinic anhydride, phthalic anhydride, isophthalic acid, terephthalic acid, and trimellitic anhydride, alicyclic polybasic acids and anhydrides thereof such as hydrophthalic anhydride and dimethyl-1,4-cyclohexanedicarboxylic acid, and the like.

Examples of the polylactonediol include a polylactonediol obtained by ring-opening addition polymerization of a hydroxyl-terminated compound (e.g., polyol or polyester polyol) and a monomer that includes a lactone ring (e.g., ε-caprolactone or β-methyl-δ-valerolactone).

Examples of the polycarbonatediol include a polycarbonatediol obtained using a diol such as 1,4-butanediol, 1,6-hexanediol, 3-methyl-1,5-pentanediol, 2-ethyl-1,3-hexanediol, 2-butyl-2-ethyl-1,3-propanediol, 1,9-nonanediol, or 2-methyl-1,8-octanediol as a raw material.

Examples of the polybutadienediol include a polybutadienediol represented by the following formula ("Poly bd R-15HT" and "Poly bd R-45HT" (manufactured by Idemitsu Kosan Co., Ltd.)), a polyisoprenediol ("Poly ip" manufactured by Idemitsu Kosan Co., Ltd.), an α,ω-polybutadiene glycol ("G-1000", "G-2000", and "G-3000" manufactured by Nippon Soda Co., Ltd.), and the like.

Examples of the polyether polyol include a polyether polyol obtained by adding propylene oxide, tetrahydrofuran, or butylene oxide to a polyalkylene glycol (e.g., polyethylene glycol (PEG) diol, polypropylene glycol (PPG) diol, or polybutylene glycol (PBG) diol), bisphenol A, bisphenol F, hydrogenated bisphenol A, hydrogenated bisphenol F, or the like.

Examples of the polymer diols of a compound that includes a rosin skeleton or a hydrogenated rosin skeleton include Pine Crystal D-6011 and Pine Crystal D-6240 (manufactured by Arakawa Chemical Industries, Ltd.).

The polyisocyanate compound is not particularly limited as long as the polyisocyanate compound includes two or more isocyanate groups in its molecule. A diisocyanate compound or a polyisocyanate compound having three or more isocyanate groups may be used depending on the application.

Examples of the diisocyanate compound include diphenylmethane diisocyanate (hereinafter may be referred to as "MDI"), a polyphenylenepolymethylene polyisocyanate, tolylene diisocyanate (hereinafter may be referred to as "TDI"), xylylene diisocyanate, tetramethylxylylene diisocyanate, isophorone diisocyanate (hereinafter may be referred to as "IPDI"), hexamethylene diisocyanate (hereinafter may be referred to as "HDI"), tetramethylene diisocyanate, dodecamethylene diisocyanate, trimethylhexamethylene diisocyanate, 1,3-cyclohexylene diisocyanate, naphthalene diisocyanate, hydrogenated diphenylmethane diisocyanate (hereinafter may be referred to as "hydrogenated MDT"), hydrogenated xylylene diisocyanate, 1,3-bis(isocyanatomethyl)cyclohexane (hydrogenated XDI), a compound obtained by substituting some of the isocyanate groups of such an isocyanate group-containing compound with a biuret group, an allophanate group, a carbodiimide group, a uretonimine group, an oxazolidone group, an amide group, an imide group, an isocyanurate group, or a urethodione group, and the like. These compounds may be used either alone or in combination.

Among these diisocyanate compounds, it is preferable to use a nonaromatic diisocyanate compound that shows a low rate of reaction with water as compared with an aromatic diisocyanate compound. It is desirable that the isocyanate end group of the water-dispersible polyurethane resin (III) be derived from an alicyclic or aliphatic diisocyanate that relatively slowly reacts with water. An aromatic diisocyanate compound can be introduced into the molecule when the isocyanate end group is derived from an alicyclic or aliphatic

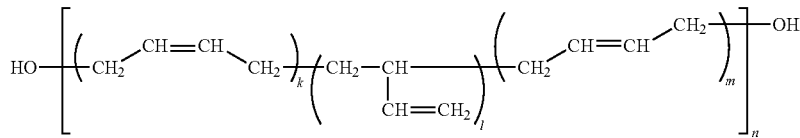

wherein k=0.2, l=0.2, m=0.6, and n is a positive integer.

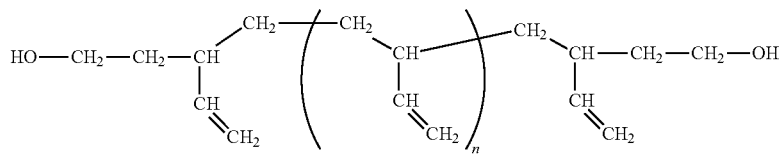

wherein n is a positive integer.

diisocyanate. The water-dispersible polyurethane resin (III) may be produced by reacting an aromatic diisocyanate with an excess (molar ratio) of the diol, and reacting the resulting product with an alicyclic or aliphatic diisocyanate, for example. Since an aromatic diisocyanate has high reactivity with a diol as compared with an alicyclic or aliphatic diisocyanate, an isocyanate end group derived from an alicyclic or aliphatic diisocyanate can be formed by controlling the reaction temperature and the like by utilizing the difference in reactivity.

When the isocyanate group included in the water-dispersible polyurethane resin (III) having an isocyanate end group or the polyisocyanate compound (IV) reacts with the basic compound (II) that has two or more amino groups in its molecule and is present on the surface of the pigment (I) that is dispersed in water, a competing reaction of the amino group and water occurs. Therefore, a nonaromatic diisocyanate compound that has a low rate of reaction with water as compared with an aromatic diisocyanate compound (e.g., MDI or TDI) is preferable as the diisocyanate compound. In particular, the basic compound (II) and the water-dispersible polyurethane resin (III) react preferentially when using an alicyclic diisocyanate compound (e.g., IPDI or hydrogenated MDI) or an aliphatic diisocyanate (e.g., 1,6-hexamethylene diisocyanate) as the end of the molecule. When the reaction temperature is set to 40° C. or less (preferably 15 to 30° C. or less), the difference in rate of reaction increases, so that the basic compound (II) and the water-dispersible polyurethane resin (III) react preferentially.

When producing the water-dispersible polyurethane resin (III) having an isocyanate end group by bonding a polyol compound having at least two hydroxyl groups in its molecule and a diisocyanate compound via a urethane bond, a polyurethane resin having an isocyanate group on each end can be obtained by reacting the compounds so that the number of equivalents of the isocyanate groups of the diisocyanate compound is greater than the number of equivalents of the hydroxyl groups of the compound having at least two hydroxyl groups in its molecule by 2. For example, when using a diol compound as the compound having at least two hydroxyl groups in its molecule, the number of moles of the diisocyanate compound is set to be larger than that of the diol compound by 1. A polymer having an isocyanate end group may be accurately obtained (i.e., a polyurethane resin that exhibits a small variation in molecular weight distribution may be obtained) by synthesizing an isocyanate-terminated oligomer stepwise (i.e., increasing the molecular weight stepwise).

When producing the polyurethane resin by reacting a compound having two hydroxyl groups in the molecule with a diisocyanate compound, the water-dispersible polyurethane resin (III) having an isocyanate end group may be synthesized by reacting the diol compound and the diisocyanate compound in an organic solvent so that the total number of moles of the diisocyanate compound is "n+1" when the total number of moles of the diol compound is referred to as "n".

It is preferable that the water-dispersible polyurethane resin (III) have an acid number of 20 to 120 mg KOH/g, more preferably 30 to 110 mg KOH/g, and still more preferably 35 to 100 mg KOH/g on a solid basis, so that the water-dispersible polyurethane resin (III) can be dispersed in water.

The acid number may be adjusted by adjusting the number of moles of a tertiary carboxyl group-containing diol compound.

When using a tertiary carboxyl group-containing diol compound as the compound having a functional group or a molecular chain that can be dispersed in the aqueous medium and having two or more hydroxyl groups in its molecule, and using a diisocyanate compound as the polyisocyanate compound, the acid number (AN) of the water-dispersible polyurethane resin (III) is calculated by the following expression.

$$AN = \frac{a1 \cdot 56 \cdot 11 \cdot 10^3}{\sum_{n=1}^{n} an \cdot An + \sum_{n=1}^{n} bn \cdot Bn}$$

where, a1 is the number of moles of the tertiary carboxyl group-containing diol compound (e.g., dimethylolpropionic acid), A1 is the molecular weight of the tertiary carboxyl group-containing diol compound (e.g., dimethylolpropionic acid), an is the number of moles of an additional diol, An is the molecular weight of the additional diol, bn is the number of moles of the diisocyanate compound, and Bn is the molecular weight of the diisocyanate compound.

When using a diol compound as the polyol, and using a diisocyanate compound as the polyisocyanate compound, the number average molecular weight of the water-dispersible polyurethane resin (III) is calculated (adjusted) by the following expression.

Number average molecular weight = $nA' + (n+1)B'$ where, n is the total number of moles of the polyol, A' is the number average molecular weight of the polyol, and B' is the number average molecular weight of the diisocyanate compound.

The number average molecular weight of the water-dispersible polyurethane resin (III) calculated by the following expression is preferably 1000 to 15,000, more preferably 1300 to 10,000, and still more preferably 1600 to 8000. The acid number of the water-dispersible polyurethane resin (III) is preferably 20 to 200 mg KOH/g, more preferably 25 to 150 mg KOH/g, and still more preferably 30 to 120 mg KOH/g.

When producing the polyurethane resin using a trifunctional or higher functional polyol and the polyisocyanate compound, it is desirable to prevent gelation by adjusting the molar fraction in accordance with Flory's equation or the like.

When producing the water-dispersible polyurethane resin (III) having an isocyanate end group, the polyol and the polyisocyanate compound are preferably reacted at 60 to 80° C. in order to suppress side reactions. The polyol and the polyisocyanate compound may be reacted without using a solvent, or may be reacted using an arbitrary organic solvent (e.g., ethyl acetate, methyl ethyl ketone, or acetonitrile) that is normally used for a urethane reaction. An arbitrary urethane reaction catalyst such as a tertiary amine-based catalyst, dibutyltin laurate, or tin(II) octylate may be used when reacting the polyol and the polyisocyanate compound. Note that the urethane reaction catalyst need not necessarily be used.

When producing the water-dispersible polyurethane resin (III) using a tertiary carboxyl group-containing polyol compound or the like, it is preferable to appropriately add a tertiary amine such as triethylamine, trimethylamine, N-methylmorpholine, tributylamine, N-methylpyrazine, or methylidazole during phase inversion of the polyurethane resin into the aqueous medium.

It is preferable that the water-dispersible polyurethane resin (III) have an anionic or nonionic water-dispersible group in the molecular chain. When the water-dispersible polyurethane resin (III) has an anionic water-dispersible group, it is preferable to neutralize the water-dispersible polyurethane resin (III) with a counter ion before dispersing the water-dispersible polyurethane resin (III) in water.

Examples of the polyisocyanate compound (IV) used to produce the polyurethane resin-bonded pigment according to one embodiment of the invention include polyisocyanate compounds obtained by modifying some of the isocyanate groups of an isocyanate group-containing compound (e.g., an aromatic isocyanate such as MDI, TDI, xylylene diisocyanate, tetramethylxylylene diisocyanate, or naphthalene diisocyanate, an aliphatic isocyanate such as hexamethylene diisocyanate, tetramethylene diisocyanate, dodecamethylene diisocyanate, or trimethylhexamethylene diisocyanate, or an alicyclic isocyanate such as isophorone diisocyanate, 1,3-cyclohexylene diisocyanate, hydrogenated diphenylmethane diisocyanate, or hydrogenated xylylene diisocyanate) with a biuret group, an allophanate group, a carbodiimide group, a uretonimine group, an oxazolidone group, an amide group, an imide group, an isocyanurate group, a urethodione group, or the like. These compounds may be used either alone or in combination.

It is preferable that the polyisocyanate compound (IV) be a derivative of a nonaromatic diisocyanate compound that has a low rate of reaction with water in the same manner as the water-dispersible polyurethane resin (III). It is particularly preferable that the polyisocyanate compound (IV) be a derivative of an alicyclic diisocyanate compound (e.g., hydrogenated XDI, IPDI, or hydrogenated MDI) or a derivative of an aliphatic diisocyanate compound (e.g., 1,6-hexamethylene diisocyanate or trimethylhexamethylene diisocyanate).

Examples of a polyisocyanate derived from an alicyclic diisocyanate or an aliphatic diisocyanate include biuret-type polyisocyanate compounds, isocyanurate-type polyisocyanate compounds, polyol adduct-type polyisocyanate compounds, bifunctional prepolymer-type polyisocyanate compounds, and the like. A water-dispersible polyisocyanate compound may optionally be used.

The polyisocyanate single compound (IV) normally does not exhibit dispersibility in the aqueous medium, but can be dispersed in the aqueous medium in the presence of the water-dispersible polyurethane resin (III) having an isocyanate end group.

The polyurethane resin-bonded aqueous pigment dispersion according to one embodiment of the invention is produced by bringing the pigment (I) having a surface acidic group into contact with the basic compound (II) having two or more amino groups selected from a primary amino group and a secondary amino group in its molecule in an aqueous medium to obtain a pigment having an unreacted surface amino group, and bringing the pigment having an unreacted surface amino group into contact with the water-dispersible polyurethane resin (III) having an isocyanate end group and the polyisocyanate compound (IV).

In order to improve dispersibility, it is preferable to prepare a mixture of the water-dispersible polyurethane resin (III) having an isocyanate end group and the polyisocyanate compound (IV) in advance, and bring the mixture into contact with an aqueous solution of the pigment having an unreacted surface amino group.

It is preferable to mix the water-dispersible polyurethane resin (III) having an isocyanate end group and the polyisocyanate compound (IV) with an aqueous solution of the pigment having an unreacted surface amino group at 40° C. or less, and more preferably 15 to 30° C.

When the isocyanate group included in the water-dispersible polyurethane resin (III) having an isocyanate end group or the polyisocyanate compound (IV) reacts with the pigment having an unreacted surface amino group, a competing reaction of the amino group and water occurs. However, when the reaction temperature is 40° C. or less, a difference in rate of reaction occurs, so that the basic compound (II) having two or more amino groups in its molecule and the water-dispersible polyurethane resin (III) having an isocyanate end group react preferentially.

It is preferable to add the water-dispersible polyurethane resin (III) having an isocyanate end group and the polyisocyanate compound (IV) in an amount of 0.5 to 200 parts by mass (more preferably 2 to 100 parts by mass) on a solid basis based on 100 parts by mass of the pigment (I). If the total amount of the water-dispersible polyurethane resin (III) and the polyisocyanate compound (IV) is less than 0.5 parts by mass based on 100 parts by mass of the pigment (I), it may be difficult to obtain a dried ink film that exhibits sufficient performance. If the total amount of the water-dispersible polyurethane resin (III) and the polyisocyanate compound (IV) exceeds 200 parts by mass based on 100 parts by mass of the pigment (I), it may be difficult to obtain sufficient image density.

The mass ratio of the water-dispersible polyurethane resin (III) having an isocyanate end group to the polyisocyanate compound (IV) is determined depending on the dispersibility of the water-dispersible polyurethane resin (III) in the aqueous medium, and is not particularly limited as long as the water-dispersible polyurethane resin (III) and the polyisocyanate compound (IV) can be dispersed when mixing the polyisocyanate compound (IV) that exhibits low dispersibility in the aqueous medium with an aqueous solution of the pigment having an unreacted surface amino group.

It is preferable to mix the water-dispersible polyurethane resin (III) having an isocyanate end group and the polyisocyanate compound (IV) so that the amount of the polyisocyanate compound (IV) is 1 to 50 parts by mass, more preferably 2 to 30 parts by mass, and still more preferably 3 to 20 parts by mass, based on 100 parts by mass of the water-dispersible polyurethane resin (III).

If the amount of the polyisocyanate compound (IV) is large, the degree of crosslinking of the polymer on the surface of the pigment increases, so that rubfastness and water resistance can be improved. On the other hand, a decrease in resolubility may occur. Therefore, it is desirable to determine the mass ratio of the water-dispersible polyurethane resin (III) to the polyisocyanate compound (IV) taking account of the balance between rubfastness, water resistance, resolubility, and the like.

When the water-dispersible polyurethane resin (III) and the polyisocyanate compound (IV) are brought into contact with an aqueous solution of the pigment having an unreacted surface amino group, the isocyanate group included in the water-dispersible polyurethane resin (III) reacts with the surface amino group of the pigment to form a urea bond. It is conjectured that the above reaction normally occurs instantaneously. It is preferable to stir the mixture at 40 to 50° C. for 1 hour or more to complete the reaction.

After completion of the reaction, the organic solvent mixed in the raw materials subjected to the reaction may be appropriately removed by effecting distillation at about 50° C. under reduced pressure.

The polyurethane resin-bonded pigment according to one embodiment of the invention is thus produced by bonding the water-dispersible polyurethane resin (III) to the unreacted surface amino group of the pigment via a urea bond. The degree of crosslinking of the water-dispersible polyurethane resin (III) is increased by utilizing the polyisocyanate compound (IV) together with the water-dispersible polyurethane resin (III), so that a highly crosslinked polymer is bonded to the surface of the pigment. When the polyisocyanate compound is branched, a branched structure can be added to the crosslinked structure of the water-dispersible polyurethane resin (III), so that a structure in which a highly crosslinked polymer having a branched structure or a network structure is bonded to the surface of the pigment is obtained. Since a pigment to which a highly crosslinked polymer having an elongated chain, a branched structure, or a network structure has a hard and rigid coating, the polyurethane resin-bonded pigment according to one embodiment of the invention exhibits excellent rubfastness, marker resistance, image density, dispersibility, storage stability, and the like when used for a pigment dispersion composition by appropriately forming the coating.

In particular, since the polyurethane resin-bonded pigment according to one embodiment of the invention is produced by bonding the water-dispersible polyurethane resin (III) having an isocyanate end group to the pigment (I) via a urea bond, the polyurethane resin-bonded pigment exhibits excellent dispersibility and dispersion stability even if the surface of the pigment (I) has a low acidic group concentration.

A process for producing a polyurethane resin-bonded aqueous pigment according to one embodiment of the invention is described below.

The process for producing a polyurethane resin-bonded pigment according to one embodiment of the invention includes bringing (I) a pigment having a surface acidic group into contact with (II) a basic compound having two or more amino groups selected from a primary amino group and a secondary amino group in its molecule in an aqueous medium to obtain a pigment having an unreacted surface amino group, and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

The description given above in connection with the polyurethane resin-bonded pigment according to one embodiment of the invention may be applied to the process for producing a polyurethane resin-bonded pigment according to one embodiment of the invention.

A pigment dispersion composition according to one embodiment of the invention is described below.

The pigment dispersion composition according to one embodiment of the invention includes the polyurethane resin-bonded pigment according to one embodiment of the invention, or a polyurethane resin-bonded pigment produced by the process according to one embodiment of the invention.

The description given above in connection with the polyurethane resin-bonded pigment according to one embodiment of the invention may be applied to the polyurethane resin-bonded pigment included in the pigment dispersion composition according to one embodiment of the invention.

The pigment dispersion composition according to one embodiment of the invention may include a known additive (e.g., water-dispersible resin, moisturizer, preservative, emulsifier, pH-adjusting agent, anti-foaming agent, and smoothing agent), an aqueous wax dispersion, a resin emulsion, and the like in addition to the polyurethane resin-bonded pigment.

The moisturizer may be one or more compounds selected from polyoxyalkylene ether glycols (e.g., glycerol, diethylene glycol, triethylene glycol, and dipropylene glycol), monoalkyl ethers and dialkyl ethers of polyoxyalkylene ether glycols, and the like.

The pigment dispersion composition according to one embodiment of the invention may be prepared by stirring the polyurethane resin-bonded pigment in a container optionally together with a water-dispersible resin, an additive (e.g., moisturizer, preservative, emulsifier, pH-adjusting agent, anti-foaming agent, and smoothing agent), an aqueous wax dispersion, a resin emulsion, or the like, optionally adjusting the viscosity of the polyurethane resin-bonded pigment (or mixture) using water or an organic solvent, and filtering the polyurethane resin-bonded pigment (or mixture) by a known filtration method.

The pigment concentration (i.e., the mass ratio of the pigment (I)) in the pigment dispersion composition according to one embodiment of the invention may be appropriately determined depending on the type of the pigment and the application of the pigment dispersion composition. The pigment concentration is normally 2 to 20 mass %. When using the pigment dispersion composition as an inkjet ink composition utilizing a carbon black pigment, the pigment concentration may be 2 to 15 mass %.

It is preferable to prepare the pigment dispersion composition according to one embodiment of the invention so that the total amount of the water-dispersible polyurethane resin (III) and an optional water-dispersible resin is 2 to 200 parts by mass (more preferably 3 to 150 parts by mass, and still more preferably 5 to 100 parts by mass) on a solid basis based on 100 parts by mass of the pigment (I).

The pigment dispersion composition according to one embodiment of the invention may exhibit excellent image density, dispersibility, storage stability, and resolubility, and may form an ink film that exhibits marker resistance and rubfastness.

An inkjet ink composition according to one embodiment of the invention is described below.

The inkjet ink composition according to one embodiment of the invention includes the polyurethane resin-bonded pigment according to one embodiment of the invention, or a polyurethane resin-bonded pigment produced by the process according to one embodiment of the invention.

The inkjet ink composition according to one embodiment of the invention is the same as the pigment dispersion composition according to one embodiment of the invention, except that the inkjet ink composition is used for inkjet ink applications. The description given above in connection with the pigment dispersion composition may be applied to the inkjet ink composition.

The inkjet ink composition according to one embodiment of the invention may exhibit excellent image density, dispersibility, storage stability, and resolubility, and may form an ink film (coating) that exhibits marker resistance and rubfastness.

EXAMPLES

The invention is further described below by way of examples and comparative examples. Note that the invention is not limited to the following examples.

A low-oxidized carbon black pigment A used as the pigment (I) having a surface acidic group, a water-dispersible polyurethane resin 1 used as the water-dispersible polyurethane resin (III) having an isocyanate end group, and a water-dispersible polyurethane resin 2 used as the water-dispersible polyurethane resin (III) having an isocyanate end group were produced as described below.

Production of Low-oxidized Carbon Black Pigment A 100 g of carbon black a (specific surface area by nitrogen adsorption: 170 $m^2$/g, DBP absorption: 115 $cm^3$/100 g) and sodium peroxodisulfate ($Na_2S_2O_8$) (that was weighed according to the following expression (1) so that 0.10 mmol of sodium peroxodisulfate reacts with the carbon black per unit surface area ($m^2$) of the carbon black) were dissolved in purified water to obtain an aqueous solution (3 $dm^3$). The aqueous solution was added to a reaction vessel, and oxidized at 60° C. for 10 hours at a stirring speed of 0.12 s$^{-1}$.

The oxidized carbon black was filtered off, dispersed in purified water, and neutralized with a sodium hydroxide aqueous solution. The resulting carbon black slurry was centrifuged at 7.5×10$^{-3}$ s$^{-1}$ for 15 minutes using a centrifuge ("CR22F" manufactured by Hitachi-Koki Co., Ltd.). The remaining salts were separated from the supernatant liquid using an ultrafiltration membrane ("AHP-1010" manufactured by Asahi Kasei Corporation, molecular weight cut-off: 50,000), and water was removed so that the carbon black concentration was 20 mass % to obtain an aqueous dispersion of the low-oxidized carbon black pigment A.

Necessary amount of sodium peroxodisulfate (mg)=
(number of moles (mmol/m$^2$) of sodium peroxodisulfate per unit area of carbon black)×(specific surface area (m$^2$/g) of carbon black)×(amount (g) of carbon black)×(equivalent (238.1 g/mol) of sodium peroxodisulfate)   (1)

For example, the mass of sodium peroxodisulfate required to treat 100 g of the carbon black a is calculated to be 0.10 (mmol/m$^2$)×170 (m$^2$/g)×100 (g)×238.1 (g/mol)=404.770 (mg)=404.77 (g).

Synthesis of Water-dispersible Polyurethane Resin 1

A flask equipped with a stirring rod, a nitrogen gas supply tube, and an Allihn condenser was charged with 200 parts by mass of methyl ethyl ketone (MEK), 76.5 parts by mass (2.8 mol) of dimethylolpropionic acid, and 240 parts by mass (5.3 mol) of isophorone diisocyanate ("Desmodule I" manufactured by Sumika Bayer Urethane Co., Ltd.). The mixture was reacted at 65° C. for 6 hours.

After the addition of 78 parts by mass (0.5 mol) of a castor oil-modified diol ("HS-2G-150" manufactured by Hokoku Co., Ltd., number average molecular weight: 765.3), 101.3 parts by mass (0.5 mol) of a polyester diol ("P-1050" manufactured by Kuraray Ltd., number average molecular mass: 994), 104 parts by mass (0.5 mol) of a polyethylene ether glycol ("#1000" manufactured by NOF Corporation, number average molecular weight 1020), and 200 parts by mass of MEK to the mixture containing the reaction product of 76.5 parts by mass of dimethylolpropionic acid and 240 parts by mass of isophorone diisocyanate, the mixture was reacted at 65° C. for 3 hours. The isocyanate group concentration in the reaction mixture was 1.71 mass %, and the acid number of the solid was 53.4 mg KOH/g.

The mixture containing the reaction product of 78 parts by mass of the castor oil-modified diol with the reaction product of 76.5 parts by mass of dimethylolpropionic acid and 240 parts by mass of isophorone diisocyanate was then cooled to 35° C. After the addition of 46 parts by mass of N-methylmorpholine, the mixture was stirred for 30 minutes to obtain a waterborne polyisocyanate polyurethane resin (water-dispersible polyurethane resin 1) having an isocyanate end group (nonvolatile content: 60.2 mass %, Gardner bubble viscosity: T to U, GPC number average molecular weight: 3400, mass average molecular weight: 7800, ratio of number of moles of OH groups to number of moles of NCO groups (number of moles of OH groups/number of moles of NCO groups): 4.3/5.3).

Synthesis of Water-dispersible Polyurethane Resin 2

A flask equipped with a stirring rod, a nitrogen gas supply tube, and an Allihn condenser was charged with 200 parts by mass of methyl ethyl ketone, 68 parts by mass (3 mol) of dimethylolpropionic acid, and 243.6 parts by mass (2.5 mol) of hydrogenated MDI ("Desmodule W" manufactured by Sumika Bayer Urethane Co., Ltd.). The mixture was reacted at 65° C. for 6 hours.

After the addition of 64.7 parts by mass (0.5 mol) of a castor oil-modified diol ("HS-2G-150" manufactured by Hokoku Co., Ltd., number average molecular weight: 765.3), 174.6 parts by mass (0.5 mol) of a polyester diol ("P-2050" manufactured by Kuraray Ltd., number average molecular mass: 2066), and 49.1 parts by mass (0.3 mol) of a polyethylene ether glycol ("#600" manufactured by NOF Corporation, number average molecular weight 941) to the mixture containing the reaction product of 68 parts by mass of dimethylolpropionic acid and 243.6 parts by mass of hydrogenated MDI, the mixture was reacted at 65° C. for 3 hours. The isocyanate group concentration in the reaction mixture was 1.42 mass %, and the acid number of the solid was 47.4 mg KOH/g.

The mixture containing the reaction product of 64.7 parts by mass of the castor oil-modified diol with the reaction product of 68 parts by mass of dimethylolpropionic acid and 243.6 parts by mass of hydrogenated MDI was then cooled to 35° C. After the addition of 42 parts by mass of N-methylmorpholine, the mixture was stirred for 30 minutes to obtain a waterborne polyisocyanate polyurethane resin (water-dispersible polyurethane resin 2) having an isocyanate end group (nonvolatile content: 58.8 mass %, Gardner bubble viscosity: Z4 to Z5, GPC number average molecular weight: 3500, mass average molecular weight: 8050, ratio of number of moles of OH groups to number of moles of NCO groups (number of moles of OH groups/number of moles of NCO groups): 4.5/5.5).

EXAMPLE 1

(1) Production of Polyurethane Resin-bonded Pigment 1

82.7 parts by mass of a 10 mass % aqueous solution of piperazine.6H$_2$O (Mw=194) (basic compound (II)) was added to 1042 parts by mass of AquaBlack (registered trademark) 162 (manufactured by Tokai Carbon Co., Ltd., solid content: 19.2 mass %) (pigment (I)), and the mixture was stirred for 30 minutes at room temperature.

119.6 parts by mass of the water-dispersible polyurethane resin 1 (solid content: 60.2 mass %) (polyisocyanate polyurethane resin (III)), 8 parts by mass of Duranate TSS-100 (manufactured by Asahi Kasei Chemicals Corporation, NCO group content: 19.2 mass %) (polyisocyanate compound (IV)), and 11 parts by mass of N-methylmorpholine were mixed, and added to the mixture of 1042 parts by mass of AquaBlack (registered trademark) 162 and 82.7 parts by mass of the 10 mass % aqueous solution of piperazine.6H$_2$O with cooling. The mixture was stirred at room temperature for 1 hour, heated to 40° C., and stirred at 40° C. for 1 hour. The reaction solvent (MEK) was then distilled off at 50° C. under reduced pressure to obtain a polyurethane resin-bonded pigment 1 (nonvolatile content: 28 mass %).

The ratio of the mass of the pigment (I) to the total mass of the polyisocyanate polyurethane resin (III) and the polyisocyanate compound (IV) (mass of pigment (I)/total mass of polyisocyanate polyurethane resin (III) and polyisocyanate compound (IV)) in the polyurethane resin-bonded pigment 1 was 100/40 on a solid basis, and the mass ratio of the polyisocyanate polyurethane resin (III) to the polyisocyanate compound (IV) (polyisocyanate polyurethane resin (III)/polyisocyanate compound (IV)) in the polyurethane resin-bonded pigment 1 was 90/10 on a solid basis.

(2) Production of Pigment Dispersion Composition 1

66 parts by mass of glycerol, 0.6 parts by mass of an acetylene diol-based surfactant ("Surfynol 104E" manufactured by Air Products Japan, Inc.), 0.6 parts by mass of triethanolamine, and 132.8 parts by mass of ion-exchanged water were added to 100 parts by mass of the polyurethane resin-bonded pigment obtained in (1) (see Table 1). The mixture was stirred to obtain a pigment dispersion composition 1.

EXAMPLE 2

(1) Production of Polyurethane Resin-bonded Pigment 2

39.1 parts by mass of a 10 mass % aqueous solution of piperazine.6H$_2$O (Mw=194) (basic compound (II)) was added to 1042 parts by mass of the aqueous dispersion of the low-oxidized carbon black pigment A having a surface acidic group (solid content: 20.0 mass %, carboxyl group equivalent: 600 μmol/g) (pigment (I)), and the mixture was stirred at room temperature for 30 minutes.

76.5 parts by mass of the water-dispersible polyurethane resin 2 (solid content: 58.8 mass %) (polyisocyanate polyurethane resin (III)), 5 parts by mass of Duranate TSE-100 (manufactured by Asahi Kasei Chemicals Corporation, NCO group content: 12.1 mass %) (polyisocyanate compound (IV)), and 6.5 parts by mass of N-methylmorpholine were mixed, and added to the mixture of 1042 parts by mass of the aqueous dispersion of the low-oxidized carbon black pigment A and 39.1 parts by mass of the 10 mass % aqueous solution of piperazine.6H$_2$O with cooling. The mixture was stirred at room temperature for 1 hour, heated to 40° C., and stirred at 40° C. for 1 hour. The reaction solvent (MEK) was then distilled off at 50° C. under reduced pressure to obtain a polyurethane resin-bonded pigment 2 (nonvolatile content: 25 mass %).

The ratio of the mass of the pigment (I) to the total mass of the polyisocyanate polyurethane resin (III) and the polyisocyanate compound (IV) (mass of pigment (I)/total mass of polyisocyanate polyurethane resin (III) and polyisocyanate compound (IV)) in the polyurethane resin-bonded pigment 2 was 100/25 on a solid basis, and the mass ratio of the polyisocyanate polyurethane resin (III) to the polyisocyanate compound (IV) (polyisocyanate polyurethane resin (III)/polyisocyanate compound (IV)) in the polyurethane resin-bonded pigment 2 was 90/10 on a solid basis.

(2) Production of Pigment Dispersion Composition 2

66 parts by mass of glycerol, 0.6 parts by mass of an acetylene diol-based surfactant ("Surfynol 104E" manufactured by Air Products Japan, Inc.), 0.6 parts by mass of triethanolamine, and 132.8 parts by mass of ion-exchanged water were added to 100 parts by mass of the polyurethane resin-bonded pigment 2 obtained in (1) (see Table 1). The mixture was stirred to obtain a pigment dispersion composition 2.

EXAMPLE 3

(1) Production of Polyurethane Resin-bonded Pigment 3

67.6 parts by mass of a 10 mass % aqueous solution of piperazine.6H$_2$O (Mw=194) (basic compound (II)) was added to 1042 parts by mass of the aqueous dispersion of the low-oxidized carbon black pigment A having a surface acidic group (solid content: 20.0 mass %, carboxyl group equivalent: 600 μmol/g) (pigment (I)), and the mixture was stirred at room temperature for 30 minutes.

126.2 parts by mass of the water-dispersible polyurethane resin 1 (solid content: 60.2 mass %) (polyisocyanate polyurethane resin (III)), 4 parts by mass of Duranate TSS-100 (manufactured by Asahi Kasei Chemicals Corporation, NCO group content: 19.2 mass %) (polyisocyanate compound (IV)), and 10.9 parts by mass of N-methylmorpholine were mixed, and added to the mixture of 1042 parts by mass of the aqueous dispersion of the low-oxidized carbon black pigment A and 67.6 parts by mass of the 10 mass % aqueous solution of piperazine.6H$_2$O with cooling. The mixture was stirred at room temperature for 1 hour, heated to 40° C., and stirred at 40° C. for 1 hour. The reaction solvent (MEK) was then distilled off at 50° C. under reduced pressure to obtain a polyurethane resin-bonded pigment 3 (nonvolatile content: 28 mass %).

The ratio of the mass of the pigment (I) to the total mass of the polyisocyanate polyurethane resin (III) and the polyisocyanate compound (IV) (mass of pigment (I)/total mass of polyisocyanate polyurethane resin (III) and polyisocyanate compound (IV)) in the polyurethane resin-bonded pigment 3 was 100/40 on a solid basis, and the mass ratio of the polyisocyanate polyurethane resin (III) to the polyisocyanate compound (IV) (polyisocyanate polyurethane resin (III)/polyisocyanate compound (IV)) in the polyurethane resin-bonded pigment 3 was 95/5 on a solid basis.

(2) Production of Pigment Dispersion Composition 3

66 parts by mass of glycerol, 0.6 parts by mass of an acetylene diol-based surfactant ("Surfynol 104E" manufactured by Air Products Japan, Inc.), 0.6 parts by mass of triethanolamine, and 132.8 parts by mass of ion-exchanged water were added to 100 parts by mass of the polyurethane resin-bonded pigment 3 obtained in (1) (see Table 1). The mixture was stirred to obtain a pigment dispersion composition 3.

EXAMPLE 4

(1) Production of Polyurethane Resin-bonded Pigment 4

A reaction vessel was charged with a mixture of 91.8 parts by mass of the water-dispersible polyurethane resin 2 (solid content: 58.8 mass %) (polyisocyanate polyurethane resin (III)), 6 parts by mass of Duranate TSE-100 (manufactured by Asahi Kasei Chemicals Corporation, NCO group content: 12.1 mass %) (polyisocyanate compound (IV)), and 9.2 parts by mass of dimethylethanolamine. The mixture was stirred with cooling.

A mixture prepared by mixing 1042 parts by mass of the aqueous dispersion of the low-oxidized carbon black pigment A having a surface acidic group (solid content: 20.0 mass %, carboxyl group equivalent: 600 μmol/g) (pigment (I)) and 56.4 parts by mass of a 10 mass % aqueous solution of piperazine.6H$_2$O (Mw=194) (basic compound (II)) for 30 minutes with cooling was added to the reaction vessel charged with the mixture of 91.8 parts by mass of the water-dispersible polyurethane resin 2, 6 parts by mass of Duranate TSE-100, and 9.2 parts by mass of dimethylethanolamine with cooling.

The mixture was stirred for 1 hour without cooling, heated to 40° C., and stirred at 40° C. for 1 hour. The reaction solvent (MEK) was then distilled off at 50° C. under reduced pressure to obtain a polyurethane resin-bonded pigment 4 (nonvolatile content: 26 mass %).

The ratio of the mass of the pigment (I) to the total mass of the polyisocyanate polyurethane resin (III) and the polyisocyanate compound (IV) (mass of pigment (I)/total mass of polyisocyanate polyurethane resin (III) and polyisocyanate compound (IV)) in the polyurethane resin-bonded pigment 4 was 100/30 on a solid basis, and the mass ratio of the polyisocyanate polyurethane resin (III) to the polyisocyanate compound (IV) (polyisocyanate polyurethane resin (III)/polyisocyanate compound (IV)) in the polyurethane resin-bonded pigment 4 was 90/10 on a solid basis.

(2) Production of Pigment Dispersion Composition 4

66 parts by mass of glycerol, 0.6 parts by mass of an acetylene diol-based surfactant ("Surfynol 104E" manufactured by Air Products Japan, Inc.), 0.6 parts by mass of triethanolamine, and 132.8 parts by mass of ion-exchanged water were added to 100 parts by mass of the polyurethane resin-bonded pigment 4 obtained in (1) (see Table 1). The mixture was stirred to obtain a pigment dispersion composition 4.

EXAMPLE 5

(1) Production of Polyurethane Resin-bonded Pigment 5

A reaction vessel was charged with a mixture of 91.8 parts by mass of the water-dispersible polyurethane resin 2 (solid content: 58.8 mass %) (polyisocyanate polyurethane resin (III)), 6 parts by mass of Duranate TSE-100 (manufactured by Asahi Kasei Chemicals Corporation, NCO group content: 12.1 mass %) (polyisocyanate compound (IV)), and 9.2 parts by mass of dimethylethanolamine. The mixture was stirred with cooling.

A mixture prepared by mixing 1042 parts by mass of the aqueous dispersion of the low-oxidized carbon black pigment A having a surface acidic group (solid content: 20.0 mass %, carboxyl group equivalent: 600 μmol/g) (pigment (I)) and 56.4 parts by mass of a 10 mass % aqueous solution of piperazine.6H$_2$O (Mw=194) (basic compound (II)) for 30 minutes with cooling was added to the reaction vessel charged with the mixture of 91.8 parts by mass of the water-dispersible polyurethane resin 2, 6 parts by mass of Duranate TSE-100, and 9.2 parts by mass of dimethylethanolamine with cooling.

The mixture was stirred for 1 hour without cooling, heated to 40° C., and stirred at 40° C. for 1 hour. After the addition of 90.9 parts by mass of a polyurethane dispersion ("Hydran AP-40F" manufactured by DIC Corporation, nonvolatile content: 22 mass %) based on 1042 parts by mass of the aqueous dispersion of the low-oxidized carbon black pigment A, the reaction solvent (MEK) was then distilled off at 50° C. under reduced pressure to obtain a polyurethane resin-bonded pigment 5 (nonvolatile content: 28 mass %).

The ratio (mass of pigment (I)/(total mass of polyisocyanate polyurethane resin (III) and polyisocyanate compound (IV))/mass of polyurethane dispersion "Hydran AP-40F") in the polyurethane resin-bonded pigment 5 was 100/30/10 on a solid basis, and the mass ratio of the polyisocyanate polyurethane resin (III) to the polyisocyanate compound (IV) (polyisocyanate polyurethane resin (III)/polyisocyanate compound (IV)) in the polyurethane resin-bonded pigment 5 was 90/10 on a solid basis.

(2) Production of Pigment Dispersion Composition 5

66 parts by mass of glycerol, 0.6 parts by mass of an acetylene diol-based surfactant ("Surfynol 104E" manufactured by Air Products Japan, Inc.), 0.6 parts by mass of triethanolamine, and 132.8 parts by mass of ion-exchanged water were added to 100 parts by mass of the polyurethane resin-bonded pigment 5 obtained in (1) (see Table 1). The mixture was stirred to obtain a pigment dispersion composition 5.

TABLE 1

| | | (parts by mass) | | | | |
|---|---|---|---|---|---|---|
| | | Example 1 | Example 2 | Example 3 | Example 4 | Example 5 |
| Pigment | Polyurethane resin-bonded pigment 1 (solid content: 28 mass %) | 100.0 | — | — | — | — |
| | Polyurethane resin-bonded pigment 2 (solid content: 25 mass %) | — | 100.0 | — | — | — |
| | Polyurethane resin-bonded pigment 3 (solid content: 28 mass %) | — | — | 100.0 | — | — |
| | Polyurethane resin-bonded pigment 4 (solid content: 28 mass %) | — | — | — | 100.0 | — |
| | Polyurethane resin-bonded pigment 5 (solid content: 28 mass %) | — | — | — | — | 100.0 |
| Glycerol | | 66.0 | 66.0 | 66.0 | 66.0 | 66.0 |
| Surfactant | | 0.6 | 0.6 | 0.6 | 0.6 | 0.6 |
| Amine compound | | 0.6 | 0.6 | 0.6 | 0.6 | 0.6 |
| Ion-exchanged water | | 132.8 | 132.8 | 132.8 | 132.8 | 132.8 |
| Total | | 300.0 | 300.0 | 300.0 | 300.0 | 300.0 |

Comparative Example 1

Production of Comparative Pigment Dispersion Composition 1

66 parts by mass of glycerol, 0.6 parts by mass of an acetylene diol-based surfactant ("Surfynol 104E" manufactured by AIR PRODUCTS), 0.6 parts by mass of triethanolamine, and 128.6 parts by mass of ion-exchanged water were added to 104.2 parts by mass of the aqueous dispersion of the low-oxidized carbon black pigment A having a surface acidic group (solid content: 20.0 mass %, carboxyl group equivalent: 600 μmol/g) (see Table 2). The mixture was stirred to obtain a comparative pigment dispersion composition 1.

Comparative Example 2

Production of Comparative Pigment Dispersion Composition 2

36.4 parts by mass of a polyurethane dispersion (water-dispersible polyurethane resin) ("Hydran AP-40F" manufactured by DIC Corporation, nonvolatile content: 22 mass %), 66 parts by mass of glycerol, 0.6 parts by mass of an acetylene diol-based surfactant ("Surfynol 104E" manufactured by AIR PRODUCTS), 0.6 parts by mass of triethanolamine, and 92.3 parts by mass of ion-exchanged water were added to 104.2 parts by mass of the aqueous dispersion of the low-oxidized carbon black pigment A having a surface acidic group (solid content: 20.0 mass %, carboxyl group equivalent: 600 μmol/g) (see Table 2). The mixture was stirred to obtain a comparative pigment dispersion composition 2.

The mass ratio of the low-oxidized carbon black pigment A to Hydran AP-40F (low-oxidized carbon black pigment A/Hydran AP-40F) in the comparative pigment dispersion composition 2 was 100/40 on a solid basis.

Comparative Example 3

Production of Comparative Pigment Dispersion Composition 3

66 parts by mass of glycerol, 0.6 parts by mass of an acetylene diol-based surfactant ("Surfynol 104E" manufactured by AIR PRODUCTS), 0.6 parts by mass of triethanolamine, and 128.6 parts by mass of ion-exchanged water were added to 104.2 parts by mass of AquaBlack (registered trademark) 164 having a surface acidic group (manufactured by Tokai Carbon Co., Ltd., solid content: 19.2 mass %) (see Table 2). The mixture was stirred to obtain a comparative pigment dispersion composition 3.

Comparative Example 4

Production of Comparative Pigment Dispersion Composition 4

36.4 parts by mass of a polyurethane dispersion (water-dispersible polyurethane resin) ("Hydran AP-40F" manufactured by DIC Corporation, nonvolatile content: 22 mass %), 66 parts by mass of glycerol, 0.6 parts by mass of an acetylene diol-based surfactant ("Surfynol 104E" manufactured by AIR PRODUCTS), 0.6 parts by mass of triethanolamine, and 92.3 parts by mass of ion-exchanged water were added to 104.2 parts by mass of AquaBlack (registered trademark) 164 having a surface acidic group (manufactured by Tokai Carbon Co., Ltd., solid content: 19.2 mass %) (see Table 2). The mixture was stirred to obtain a comparative pigment dispersion composition 4.

The mass ratio of AquaBlack (registered trademark) 164 to Hydran AP-40F (AquaBlack (registered trademark) 164/Hydran AP-40F) in the comparative pigment dispersion composition 4 was 100/40 on a solid basis.

tured by X-Rite Inc.), and evaluating the average OD value in accordance with the following standard. The results are shown in Tables 3 and 4.

Acceptable: The OD value was 1.4 or more.
Fair: The OD value was 1.3 or more and less than 1.4.
Unacceptable: The OD value was less than 1.3.

Evaluation of Storage Stability

The inkjet ink composition (pigment concentration: 6.7 mass %) was put in an airtight glass bottle, and stored at 70° C. for 4 weeks in an incubator. The viscosity (mPa·s) and the particle size (nm) were measured before and after the test, and the storage stability was evaluated in accordance with the following standard. The results are shown in Tables 3 and 4.

Acceptable: The viscosity (or particle size) change rate was within ±5%.
Fair: The viscosity (or particle size) change rate was outside ±5%, but within ±10%.
Unacceptable: The viscosity (or particle size) change rate was outside ±10%.

Resolubility

A drop of the inkjet ink composition (pigment concentration: 6.7 mass %) was allowed to fall onto a Teflon (registered trademark) sheet (n=4), and dried at 50° C. for 1 hour using an incubator. After washing away the inkjet ink composition with ion-exchanged water, the presence or absence of a trace of the ink was observed with the naked eye. The resolubility was evaluated in accordance with the following standard. The results are shown in Tables 3 and 4.

Acceptable: No trace was observed.
Fair: The trace remained to an extent of more than 0% and 30% or less.
Unacceptable: The trace remained to an extent of 70% or more.

Marker Resistance

An ink cartridge was charged with the inkjet ink composition (pigment concentration: 6.7 mass %), and an image was printed on plain paper using an inkjet printer ("EM-930C" manufactured by Seiko Epson Corporation). A line was

TABLE 2

| | | (parts by mass) | | | |
|---|---|---|---|---|---|
| | | Comparative Example 1 | Comparative Example 2 | Comparative Example 3 | Comparative Example 4 |
| Pigment | AquaBlack 164 (solid content: 19.2 mass %) | — | — | 104.2 | 104.2 |
| | Low-oxidized carbon black pigment A (solid content: 19.2 mass %) | 104.2 | 104.2 | — | — |
| Hydran AP-40F (solid content: 22.0 mass %) | | — | 36.4 | — | 36.4 |
| Glycerol | | 66.0 | 66.0 | 66.0 | 66.0 |
| Surfactant | | 0.6 | 0.6 | 0.6 | 0.6 |
| Amine compound | | 0.6 | 0.6 | 0.6 | 0.6 |
| Ion-exchanged water | | 128.6 | 92.3 | 128.6 | 92.3 |
| Total | | 300.0 | 300.0 | 300.0 | 300.0 |

Evaluation of Image Density

Ion-exchanged water was added to each pigment dispersion composition (pigment dispersion compositions obtained in Examples 1 to 5 and Comparative Examples 1 to 4) so that the pigment concentration was 6.7 mass % to prepare an inkjet ink composition.

An ink cartridge was charged with the inkjet ink composition, and an image was printed on plain paper using an inkjet printer ("EM-930C" manufactured by Seiko Epson Corporation). The image density was evaluated by measuring the OD value using a spectrodensitometer ("X-Rite 504" manufacdrawn along the characters printed on the plain paper using a line marker pen ("PM-LM103Y" manufactured by Kokuyo Co., Ltd.), and the marker resistance was evaluated in accordance with the following standard. The results are shown in Tables 3 and 4.

Acceptable: No mark was observed.
Fair: Some marks were observed, or blurring was observed in the print area or around the characters.
Unacceptable: The print area was blurred, and marks were observed around the print area.

Rubfastness

An ink cartridge was charged with the inkjet ink composition (pigment concentration: 6.7 mass %), and an image was printed using an inkjet printer ("EM-930C" manufactured by Seiko Epson Corporation). A weight of 300 g was applied to the solid print area using a clockmeter ("CM-5" manufactured by SDL Atlas) (rubbing tester), and the OD value (blackness) was measured using a spectrodensitometer ("X-Rite 504" manufactured by X-Rite Inc.) before and after rubbing 10 times. The rubfastness was evaluated in accordance with the following standard. The results are shown in Tables 3 and 4.

Acceptable: The ratio of the OD value before the rubbing test to the OD value after the rubbing test was 97% or more.
Fair: The ratio of the OD value before the rubbing test to the OD value after the rubbing test was 90% or more and less than 97%.
Unacceptable: The ratio of the OD value before the rubbing test to the OD value after the rubbing test was less than 90%.

TABLE 3

|  | Example 1 | Example 2 | Example 3 | Example 4 | Example 5 |
|---|---|---|---|---|---|
| Image density (OD value) | Acceptable | Acceptable | Acceptable | Acceptable | Acceptable |
| Storage stability change rate Particle size | Acceptable | Acceptable | Acceptable | Acceptable | Acceptable |
| Viscosity | Acceptable | Acceptable | Acceptable | Acceptable | Acceptable |
| Resolubility | Acceptable | Acceptable | Acceptable | Acceptable | Acceptable |
| Marker resistance | Acceptable | Acceptable | Acceptable | Acceptable | Acceptable |
| Rubfastness | Acceptable | Acceptable | Acceptable | Acceptable | Acceptable |

TABLE 4

|  | Comparative Example 1 | Comparative Example 2 | Comparative Example 3 | Comparative Example 4 |
|---|---|---|---|---|
| Image density (OD value) | Fair | Unacceptable | Fair | Fair |
| Storage stability change rate Particle size | Fair | Fair | Acceptable | Fair |
| Viscosity | Fair | Fair | Fair | Fair |
| Resolubility | Fair | Fair | Fair | Fair |
| Marker resistance | Fair | Fair | Fair | Fair |
| Rubfastness | Fair | Fair | Fair | Fair |

As is clear from the results shown in Tables 3 and 4, the pigment dispersion compositions respectively including the polyurethane resin-bonded pigments obtained in Examples 1 to 5 exhibited excellent image density, dispersibility, and storage stability, exhibited high resolubility, and formed an ink film exhibiting excellent marker resistance and rubfastness.

INDUSTRIAL APPLICABILITY

The invention thus provides a pigment that exhibits excellent image density, dispersibility, storage stability, and resolubility, and may form an ink film that exhibits marker resistance and rubfastness, and a process for producing the pigment, a pigment dispersion composition, and an inkjet ink composition.

The invention claimed is:

1. A polyurethane resin-bonded pigment produced by bringing (I) a pigment having a surface acidic group into contact with (II) a basic compound having two or more amino groups selected from a primary amino group and a secondary amino group in its molecule in an aqueous medium to obtain a pigment having an unreacted surface amino group, and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

2. The polyurethane resin-bonded pigment according to claim 1, wherein the pigment (I) having a surface acidic group is self-dispersible carbon black having a surface acidic group.

3. The polyurethane resin-bonded pigment according to claim 1, wherein the water-dispersible polyurethane resin (III) having an isocyanate end group has an acid number of 20 to 120 mg KOH/g on a solid basis.

4. The polyurethane resin-bonded pigment according to claim 3, wherein the pigment (I) having a surface acidic group is self-dispersible carbon black having a surface acidic group.

5. A pigment dispersion composition comprising the polyurethane resin-bonded pigment according to claim 1.

6. An inkjet ink composition comprising the polyurethane resin-bonded pigment according to claim 1.

7. A pigment dispersion composition comprising the polyurethane resin-bonded pigment according to claim 3.

8. A pigment dispersion composition comprising the polyurethane resin-bonded pigment according to claim 2.

9. A pigment dispersion composition comprising the polyurethane resin-bonded pigment according to claim 4.

10. An inkjet ink composition comprising the polyurethane resin-bonded pigment according to claim 3.

11. An inkjet ink composition comprising the polyurethane resin-bonded pigment according to claim 2.

12. An inkjet ink composition comprising the polyurethane resin-bonded pigment according to claim 4.

13. A process for producing a polyurethane resin-bonded pigment comprising: bringing (I) a pigment having a surface acidic group into contact with (II) a basic compound having two or more amino groups selected from a primary amino group and a secondary amino group in its molecule in an aqueous medium to obtain a pigment having an unreacted surface amino group; and bringing the pigment having an unreacted surface amino group into contact with (III) a water-dispersible polyurethane resin having an isocyanate end group and (IV) a polyisocyanate compound to bond the pigment having an unreacted surface amino group and the water-dispersible polyurethane resin (III) having an isocyanate end group via a urea bond.

14. The process according to claim 13, wherein the pigment (I) having a surface acidic group is self-dispersible carbon black having a surface acidic group.

15. The process according to claim 13, wherein the water-dispersible polyurethane resin (III) having an isocyanate end group has an acid number of 20 to 120 mg KOH/g on a solid basis.

16. The process according to claim 15, wherein the pigment (I) having a surface acidic group is self-dispersible carbon black having a surface acidic group.

17. A pigment dispersion composition comprising a polyurethane resin-bonded pigment produced by the process according to claim 13.

18. An inkjet ink composition comprising a polyurethane resin-bonded pigment produced by the process according to claim 13.

19. A pigment dispersion composition comprising a polyurethane resin-bonded pigment produced by the process according to claim 15.

20. A pigment dispersion composition comprising a polyurethane resin-bonded pigment produced by the process according to claim 14.

21. A pigment dispersion composition comprising a polyurethane resin-bonded pigment produced by the process according to claim 16.

22. An inkjet ink composition comprising a polyurethane resin-bonded pigment produced by the process according to claim 15.

23. An inkjet ink composition comprising a polyurethane resin-bonded pigment produced by the process according to claim 14.

24. An inkjet ink composition comprising a polyurethane resin-bonded pigment produced by the process according to claim 16.

* * * * *